2 Sheets—Sheet 1.

C. W. SIMONDS.
TIME AND DISTANCE RECORDER.

No. 174,584. Patented March 7, 1876.

WITNESSES
Chas. J. Gooch
Le Blond. Burdett.

INVENTOR
Calvin W. Simonds
By Knight Bros. Attorneys

2 Sheets—Sheet 2.

C. W. SIMONDS.
TIME AND DISTANCE RECORDER.

No. 174,584. Patented March 7, 1876.

WITNESSES
Chas J Gooch
Le Blond Burdett

INVENTOR
Calvin W. Simonds
By Knight Bros Attorneys

UNITED STATES PATENT OFFICE.

CALVIN W. SIMONDS, OF NORTH BOSCAWEN, NEW HAMPSHIRE, ASSIGNOR OF ONE-HALF HIS RIGHT TO ANDREW E. QUIMBY, OF SAME PLACE.

IMPROVEMENT IN TIME AND DISTANCE RECORDERS.

Specification forming part of Letters Patent No. 174,584, dated March 7, 1876; application filed February 2, 1876.

*To all whom it may concern:*

Be it known that I, CALVIN W. SIMONDS, of North Boscawen, in the county of Merrimack and State of New Hampshire, have invented a certain Improved Time and Distance Indicator for Carriages, Locomotives, and other vehicles, of which the following is a specification:

The invention consists essentially of a revolving dial operated by a clock-movement, and a marker moving radially over the said dial, and operated, through suitable gearing, by the revolution of one of the wheels of the vehicle, the mechanism being so arranged as to cause the marker to perform a complete stroke from the center to the circumference at each mile or other unit of distance which it may be desired to indicate.

Figure 1:
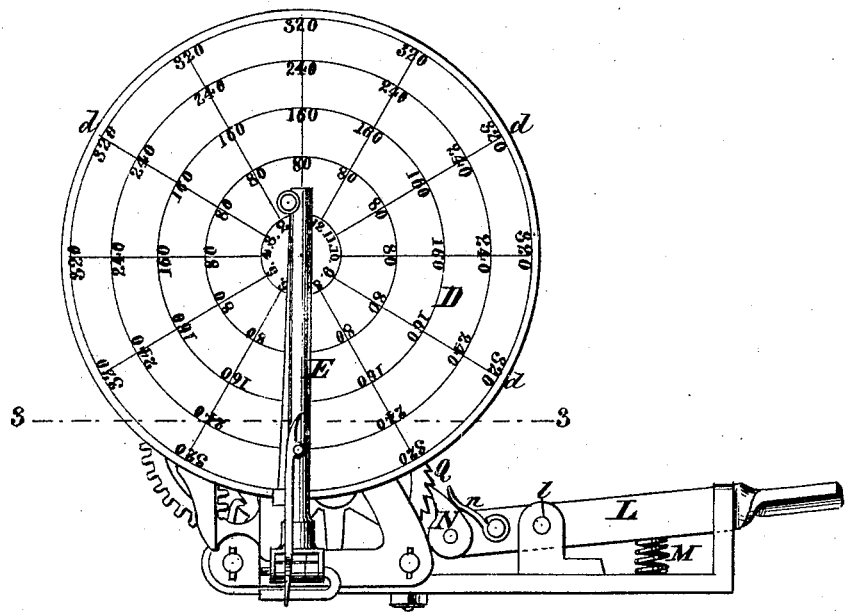
Figure 2:
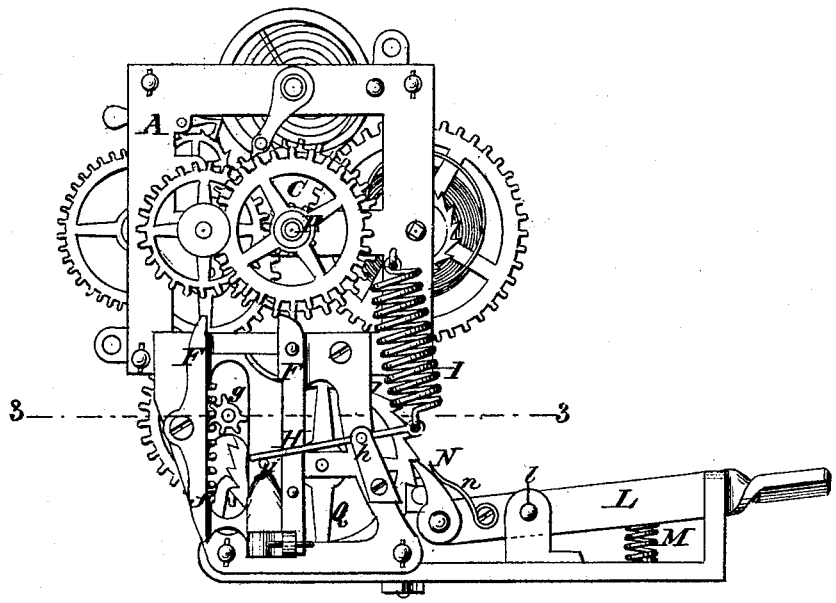
Figure 3:
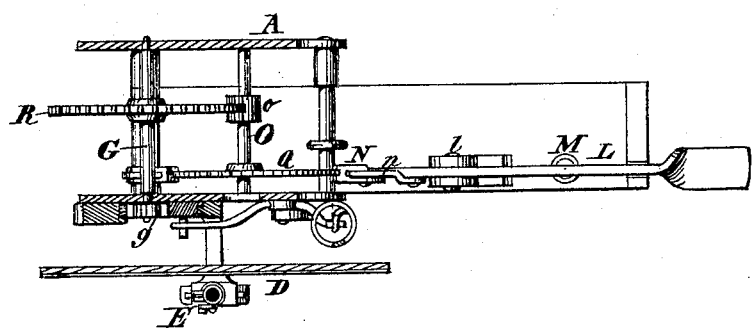
Figure 4:
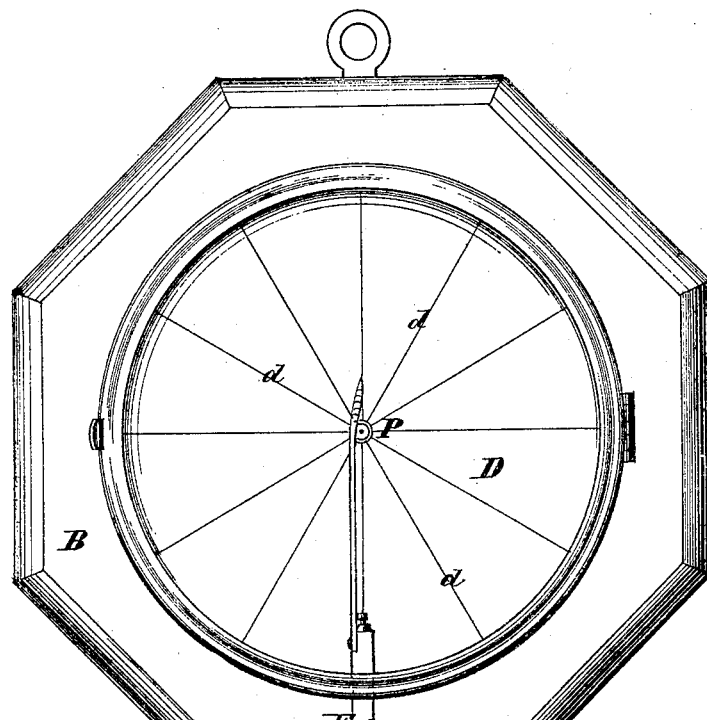
Figure 4:
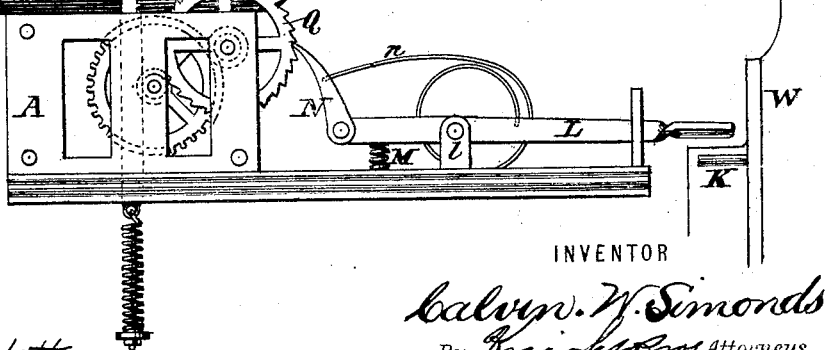

In the accompanying drawing, Figure 1 is a front elevation of an instrument illustrating the invention. Fig. 2 is a front elevation with the dial and marker removed. Fig. 3 is a horizontal section on the line 3 3, Figs. 1 and 2. Fig. 4 is a front elevation of the entire apparatus as arranged complete for use.

A represents the frame, B the casing, and C C C various working parts of a clock-movement, which may be of ordinary construction. The center-post P of the clock carries a dial, D, which may be marked with radial lines $d$, one for each hour, as illustrated in Figs. 1 and 4. The dial may further be marked with concentric circles, as shown in Fig. 1, numbered to indicate the number of revolutions of the wheel, by which the marker is brought to the successive circles, as hereinafter described, or to indicate the number of miles or any other units of distance which may be selected, and for which the mechanism may be arranged.

The numbers of the hours are shown in Fig. 1 applied at the inner circle opposite each radial line.

The marker consists of a stock or pencil-holder, E, carried by a suitable frame, F, constructed in the form of a rack having teeth $f$, with which gears a pinion, $g$, on horizontal shaft G. The pinion $g$ is constructed, as shown in Fig. 2, with one tooth omitted, so that when the marker has reached its highermost point the gap or space in the pinion being presented to the rack $f$, and the frame F thereby released, it will then be instantly thrown down by the pressure of a lever-arm, H which is fulcrumed at $h$, and operated by a spring, $i$, which draws up its rear end, causing its forward end to bear down on a stud, $j$, applied to the frame F.

The rotation of the pinion $g$ to elevate the marker-frame F is produced by the following means:

W may represent a portion of the wheel of a carriage, locomotive, or vehicle of any description, carrying on its hub or at any suitable part a tappet, K, so constructed and applied as to pass at each revolution of the wheel over the end of a lever, L, which is fulcrumed at $l$, and is retracted by a spring, M, as soon as released by the tappet K. The tappet K throws up the inner end of the lever, to which is pivoted a pawl, N, pressed by a spring, $n$, against a ratchet-wheel, Q, on a shaft, O, on which is a pinion, $o$, gearing with the wheel R on the shaft G, to which the segment-pinion $g$ is applied.

The operation is as follows: At each revolution of the wheel W the tappet K imparts an impulse to the lever L, moving the ratchet-wheel Q one tooth, communicating a diminished movement in proper proportion to the pinion $g$, by which the marker is gradually elevated until it reaches the upward extremity of its stroke, when it is instantaneously retracted to its lowermost position to commence a second ascent. As the motion of the wheel continues, the curved line produced by the marker on the face of the dial from the combined radial motion of the marker and circular motion of the dial will indicate with precision the speed at which the vehicle is moving at any given time, and the distance traveled in any given period.

Having thus described my invention, what I claim as new, and desire to secure by Letters Patent, is—

The combination, with the revolving dial D, of the marker E, moved radially by a lever and ratchet, or other suitable connection, actuated by the revolution of the wheel to be measured and retracted automatically at the end of its stroke, substantially in the manner described.

CALVIN W. SIMONDS.

Witnesses:
GEO. H. MORSE,
CHARLES E. FOOTE.